United States Patent [19]

Derou et al.

[11] Patent Number: 5,598,355
[45] Date of Patent: Jan. 28, 1997

[54] PROCESS FOR THE TRAJECTOGRAPHY OF OBJECTS AND DEVICE FOR PERFORMING THIS PROCESS

[75] Inventors: Dominique Derou, Breville sur Mer; Laurent Herault, Claix, both of France

[73] Assignee: Commissariat a l'Energie Atomique, Paris, France

[21] Appl. No.: 423,718

[22] Filed: Apr. 18, 1995

[30] Foreign Application Priority Data

May 2, 1994 [FR] France .................... 94 05325

[51] Int. Cl.⁶ .................................................. G01S 13/52
[52] U.S. Cl. ..................................................... 364/516
[58] Field of Search .................................... 364/516, 517; 395/905, 900, 3; 342/61, 62; 244/3.11, 3.12, 3.13; 382/156, 157, 158

[56] References Cited

U.S. PATENT DOCUMENTS

| 5,210,798 | 5/1993 | Ekchian et al. |         |
|-----------|--------|----------------|---------|
| 5,379,236 | 1/1995 | Yamamoto       | 364/516 |
| 5,432,712 | 7/1995 | Chan           | 364/516 |
| 5,436,832 | 7/1995 | Bessacine et al. | 364/516 |
| 5,499,195 | 3/1996 | Castolaz       | 364/516 |

OTHER PUBLICATIONS

A Dynamical Neural Network Model For Motor Cortical Activity During Movement: Population Coding Of Movement Trajectories—Lukashin et al.—Biological Cybernetics—vol. 69, No. 5/6—1993, Heidelberg de—pp. 517–524, XP397962.

Motion Trajectories—Shah et al.—Proceedings of the 1992 IEEE Computer Society Conference on Computer Vision and Pattern Recognition, Campaign (US)—Jun. 15–18, 1992—IEEE Computer Society Press, Los Alamitos (US).

Neural Target Tracking—Kim et al.—Proceedings of the IEEE International Conference on Systems, Man, and Cybernetics—Oct. 13–16, 1991—Charlottesville (US)—IEEE Press (New York)—pp. 1523–1528, XP237871.

*Primary Examiner*—Ellis B. Ramirez
*Attorney, Agent, or Firm*—Burns, Doane, Swecker & Mathis, LLP

[57] ABSTRACT

The invention relates to a process for obtaining trajectories of moving objects, by optimizing at least one criterion from the physics of the phenomenon observed and comprising the following stages: a stage of recording signals (10), a stage (11) of extracting given parts of the signals, a stage (12) of subdividing the group of parts of the signals previously extracted into classes, each class representing a potential trajectory, a stage (13, 14) of selecting a subset of classes satisfying constraints linked with the observed network type, a stage (15) of selecting from among the classes representing the potential trajectories those satisfying the constraints, so as to obtain "real" trajectories of the objects. The invention also relates to a device for performing this process.

13 Claims, 11 Drawing Sheets

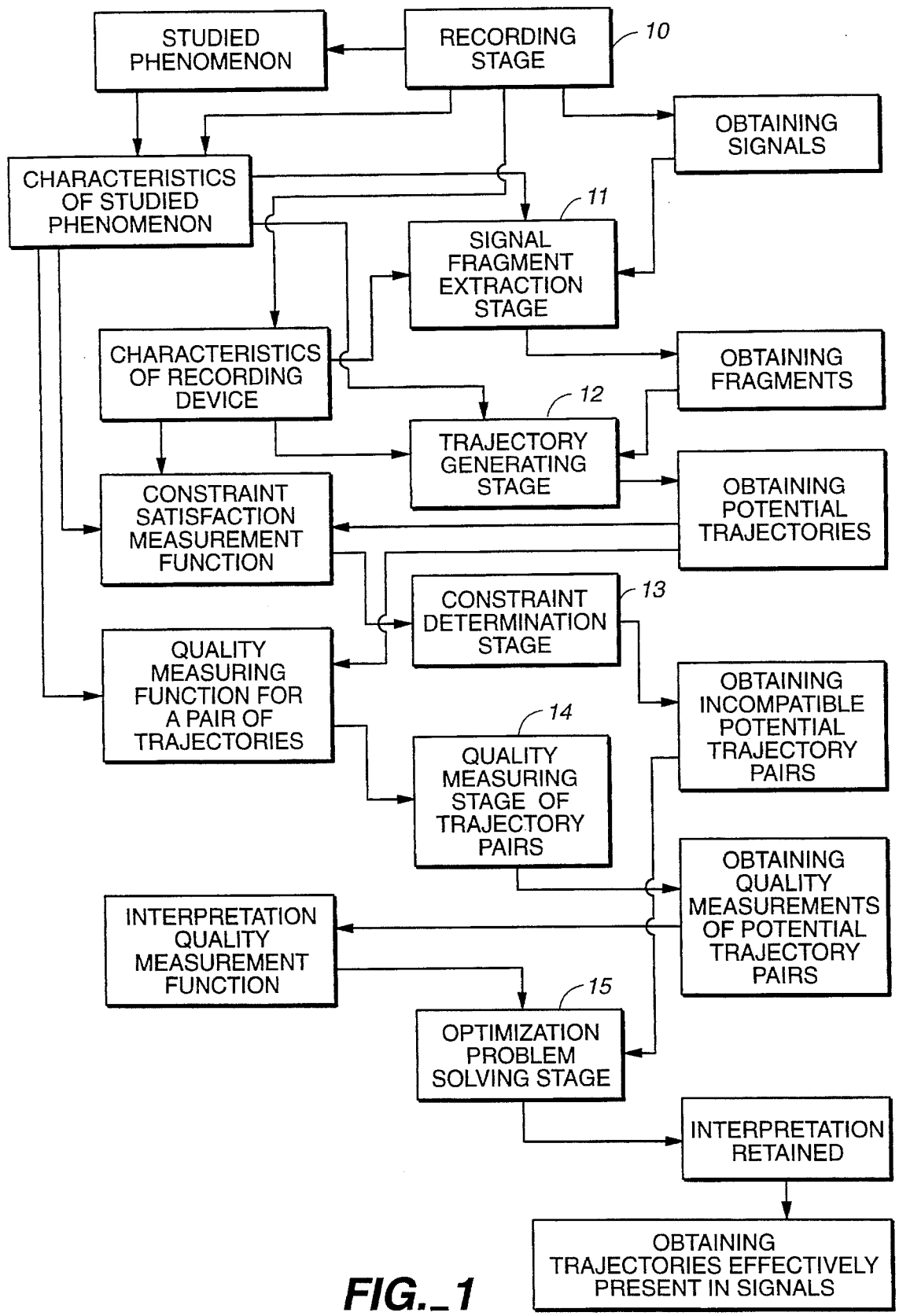
*FIG._1*

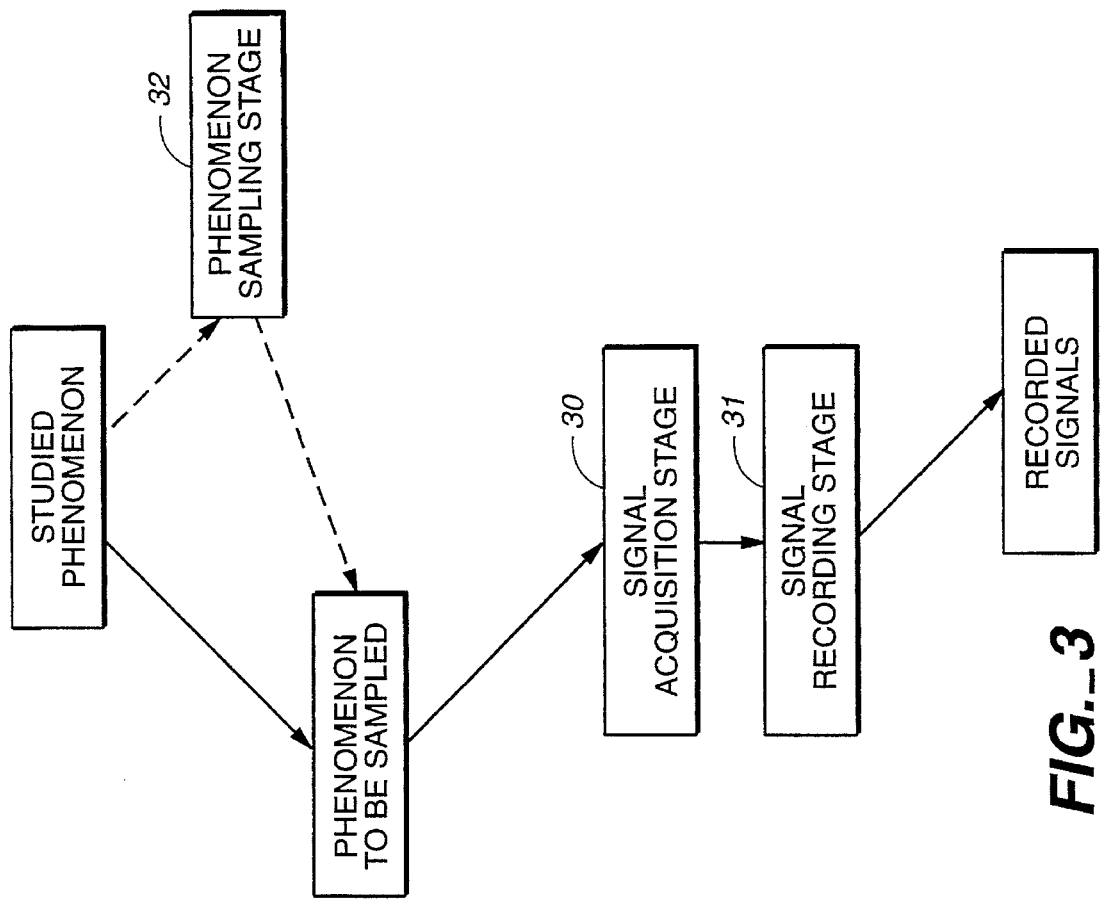
FIG._3
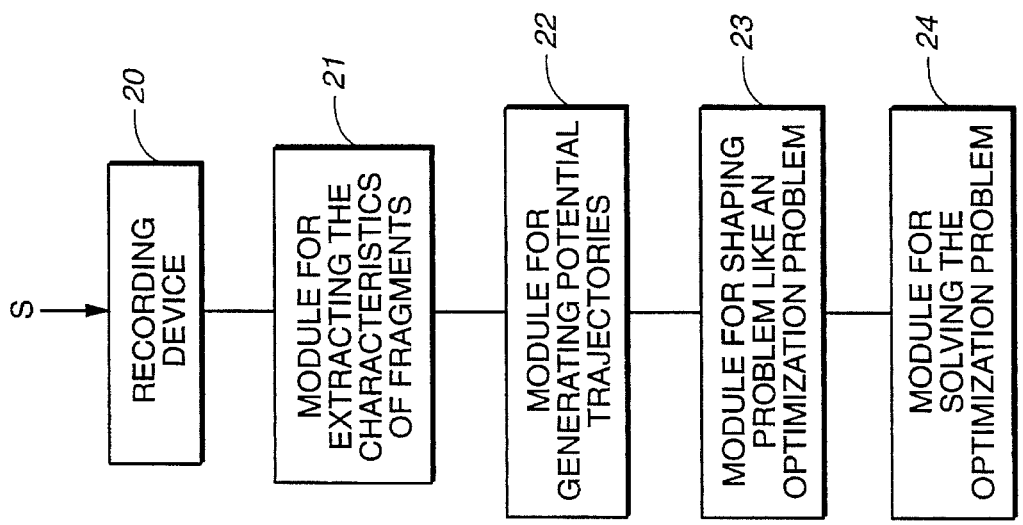
FIG._2

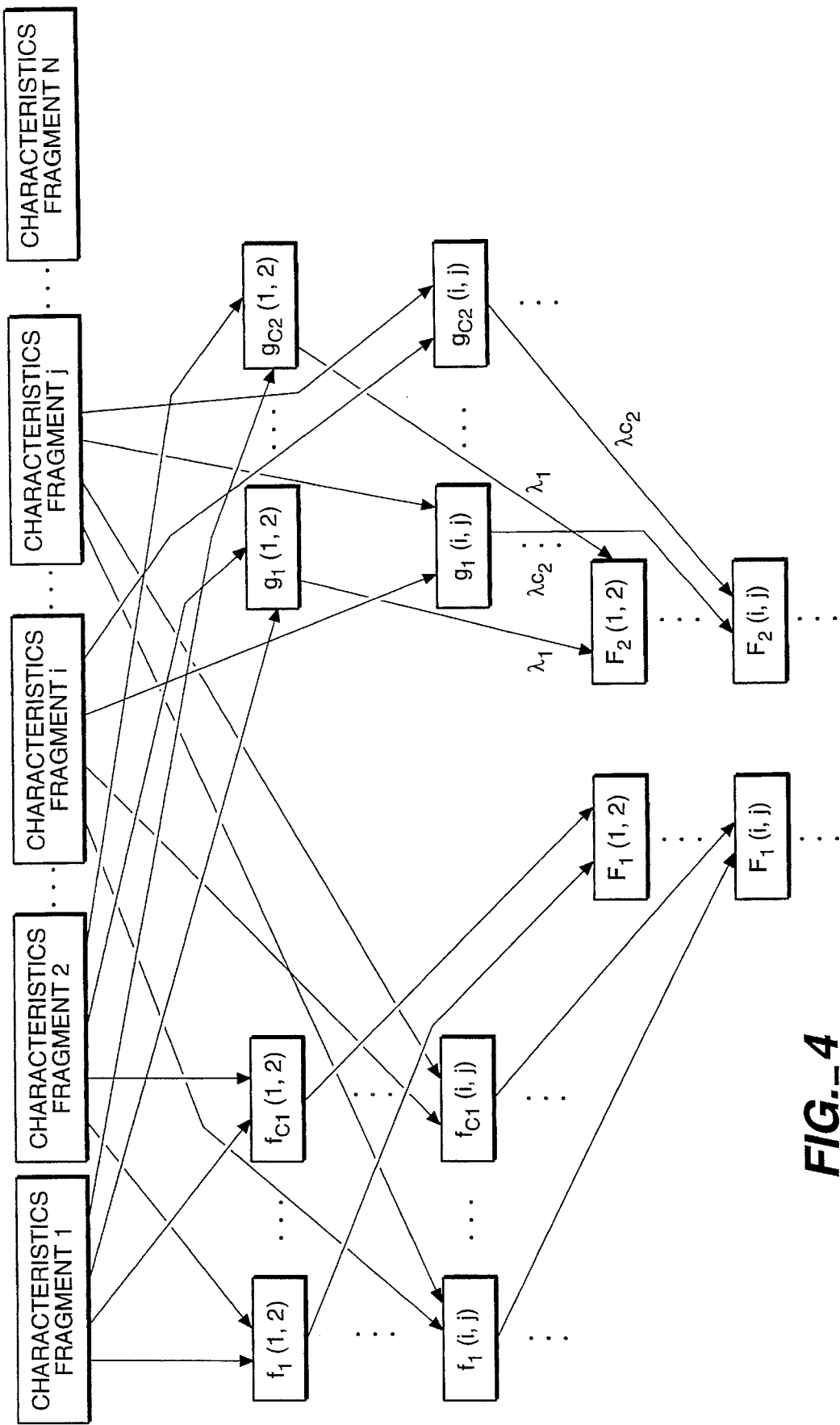
FIG._4

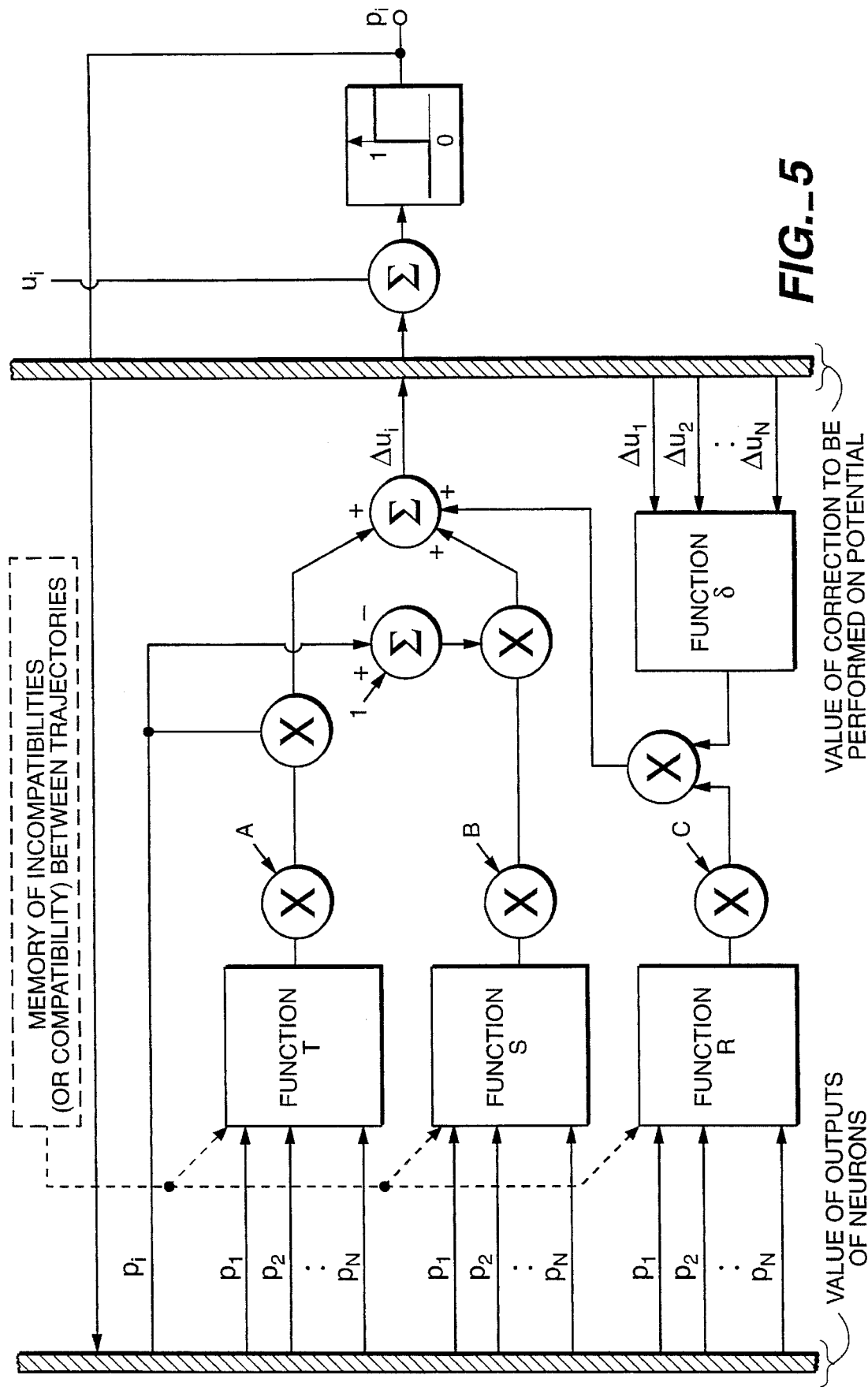
FIG._5

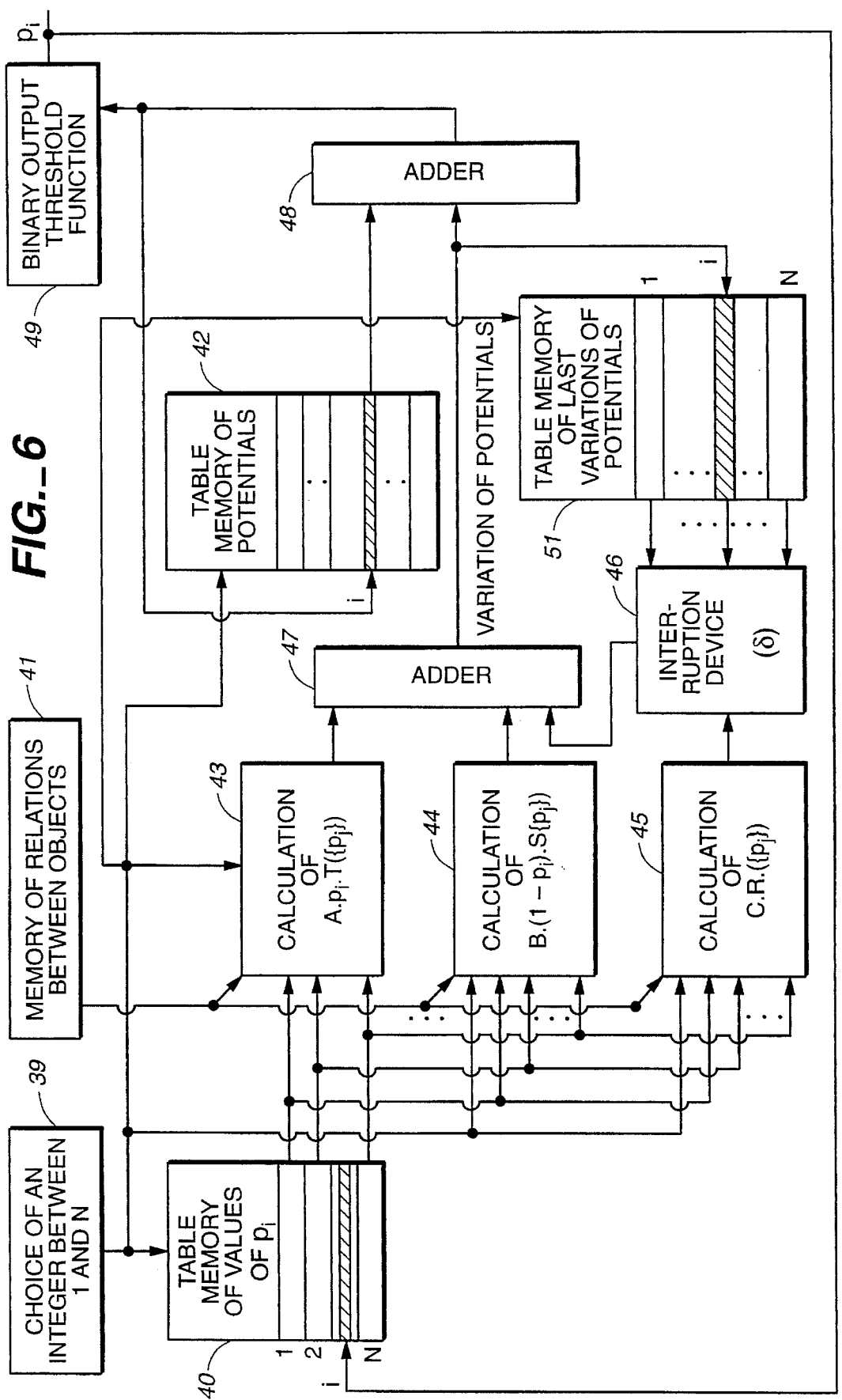
FIG._6

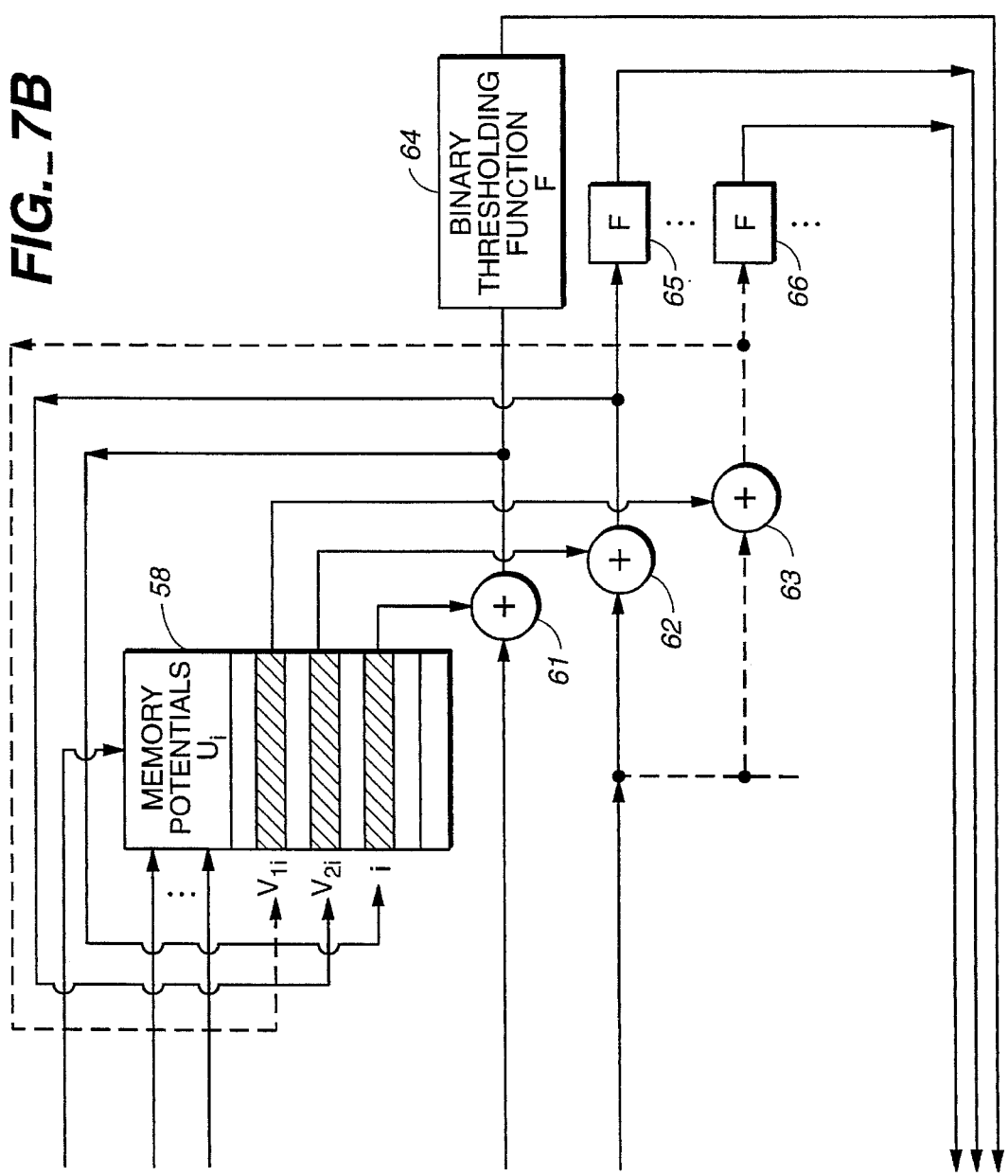

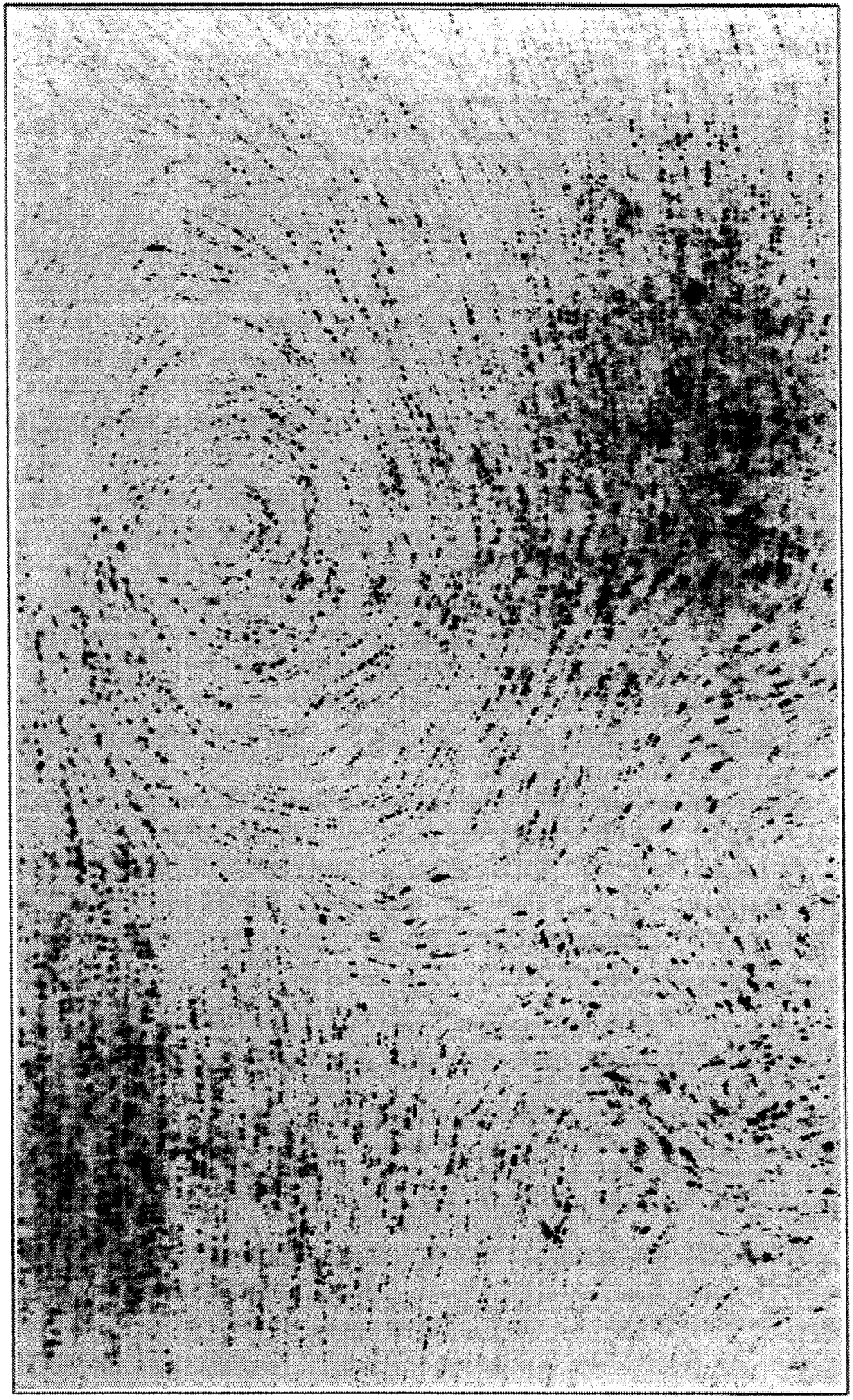
FIG._8

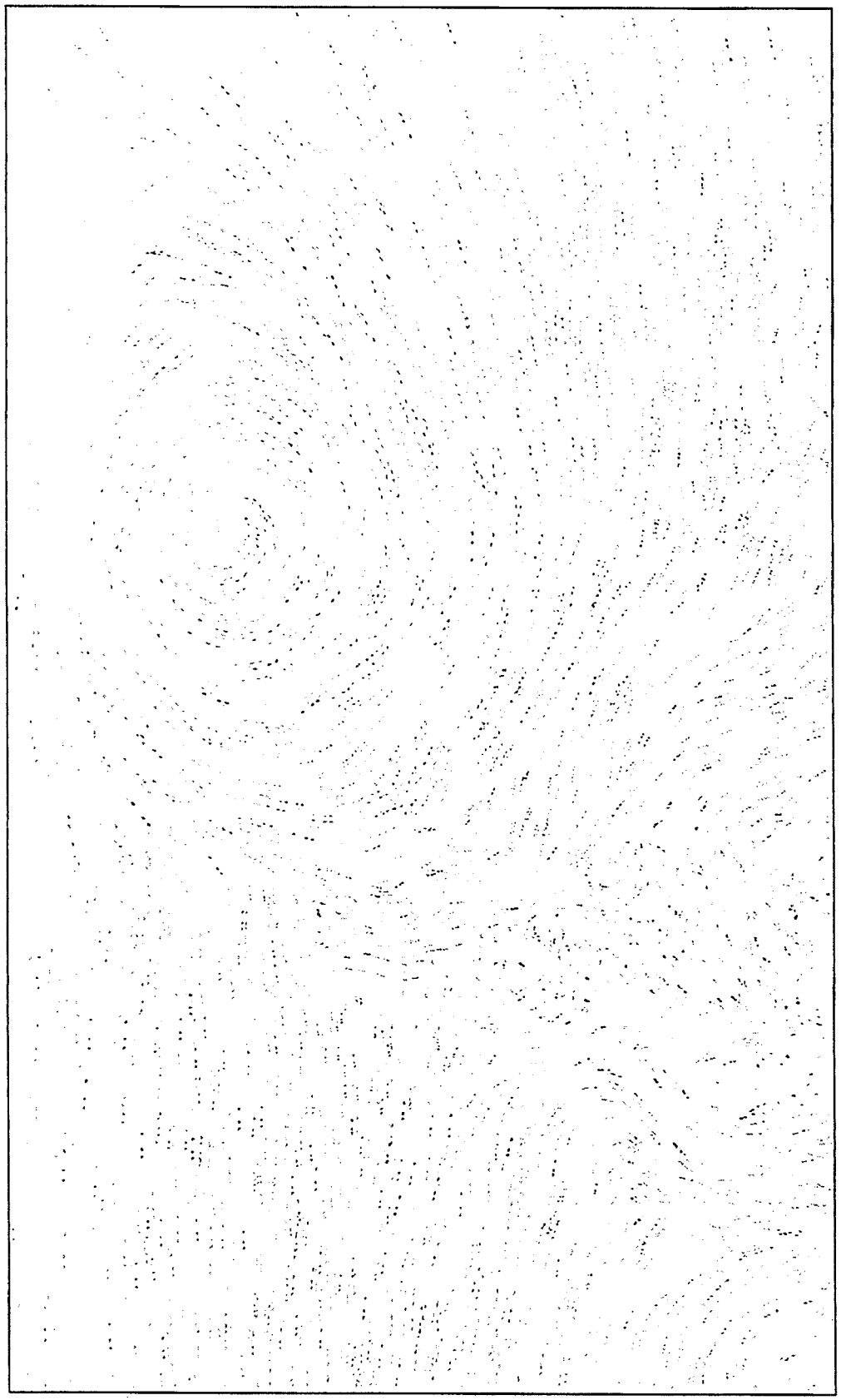
FIG._9

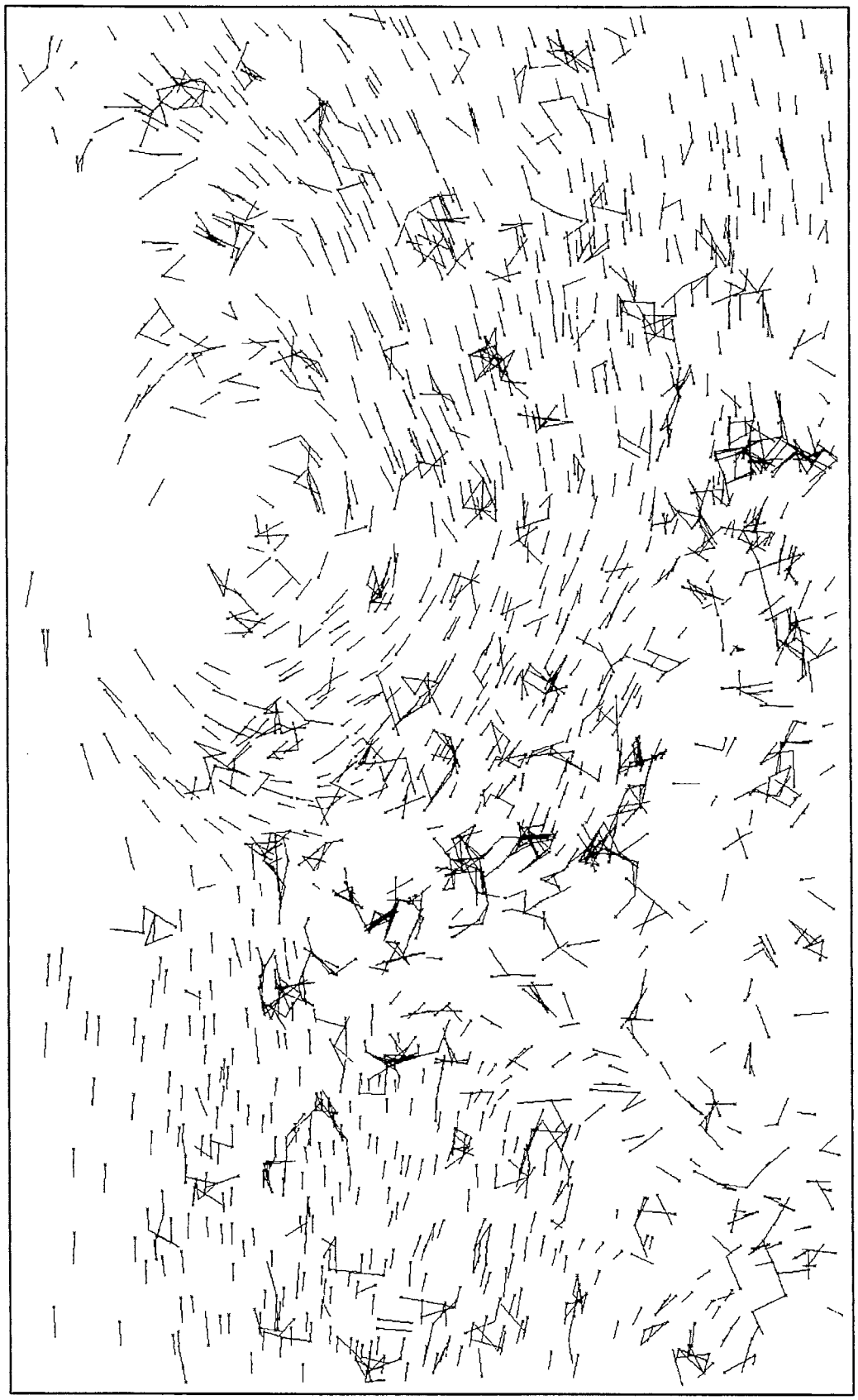
FIG._10

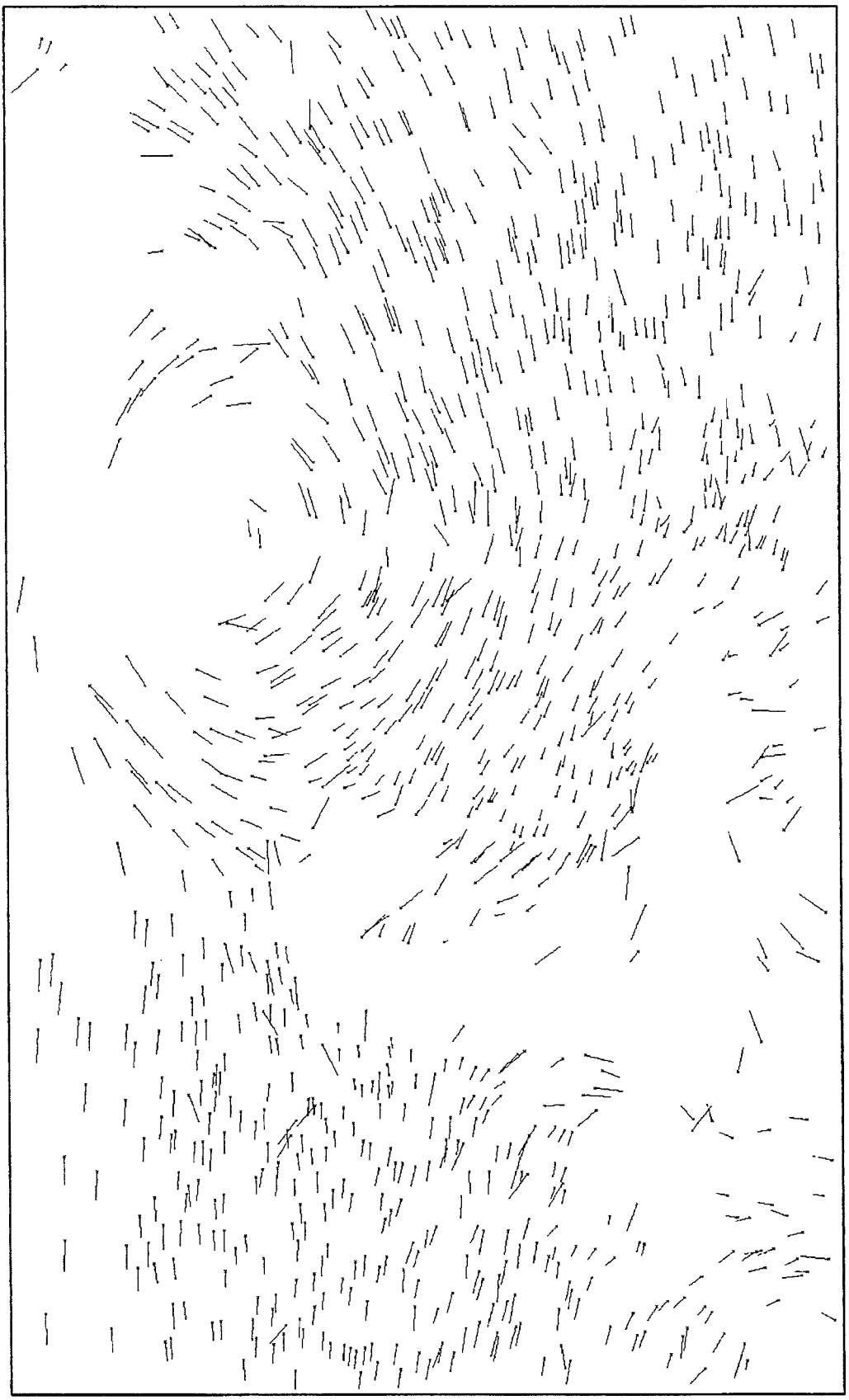
FIG._11

PROCESS FOR THE TRAJECTOGRAPHY OF OBJECTS AND DEVICE FOR PERFORMING THIS PROCESS

TECHNICAL FIELD

The present invention relates to a process for the trajectography of objects and to a device for performing this process.

PRIOR ART

The trajectography of objects relates to the study of the time and space trajectories of moving objects, e.g. moving particles. It makes it possible to induce various physical properties on objects or phenomena with which they are linked (velocity, acceleration, magnetic moment, etc.). The trajectory of objects firstly consists of recording the position thereof at several separate, consecutive instants, separated by fixed time intervals, each recording being called a fragment. Secondly, the group of fragments undergoes analysis, whilst being segmented into classes (one class regrouping several fragments) in order to reconstitute the trajectories of the objects.

Recognition of Shapes on the Basis of the Fragments

Methods serving to recognize shapes on the basis of fragments are described in various prior art articles and in particular the two articles referred to hereinafter.

An article by A. Sha'ashua and S. Ullmann entitled "Structural Saliency: the detection of globally salient structures using a locally connected network" (Proceedings of the Second International Conference on Computer Vision, pp.321–327, 1988), describes a saliency measurement based on the curvature and variation of the curvature of fragments (which are segments), saliency being the property of certain shapes to attract visual attention without requiring a complete visual scan of the image to which they belong. The problem is formalized in the form of an optimization problem, which is a matter of maximizing the global saliency measurement of the image and is solved by a relaxation method and not a neuromimetic method.

An article by P. Parent and S. W. Zucker entitled "Trace inference, curvature consistency and curve detection" (IEEE Transactions on Pattern Analysis and Machine Intelligence, vol.11, no.8, pp.823–839, 1989) makes it possible to recognize a curve on the basis of a map of pixels, a map of gradients (tangents) and a map of the curvatures of the original image. They formulate the problem of the recognition of curves in terms of a global optimization problem. They define coefficients between basic fragments and use a constraint function based on the cocircularity of neighbouring tangents and on a consistency relationship between the curvatures. A measurement called cocircularity support then calculates the saliency of each element, which is used in a functional to be minimized. The method tends to select fragments constituting smooth curves. The resolution method used is the iterative relaxation method.

Trajectory of Objects

An article by C Peterson entitled "Track finding with neural networks" (Nuclear Instruments and Methods in Physics Research, vol.A279, pp.537–545, 1989) presents a neuromimetic algorithm for finding the trajectories of particles in particle physics experiments. The algorithm is based on a neural network of the Hopfield type and on equations for updating neurons obtained from the mean field theory. The problem of tracking particles is formalized as a search for trajectories (objects) formed from the largest number of points (fragments) forming smooth and straight curves. As one neuron of the network is associated with each pair of fragments, the problem amounts to seeking curves formed from pairs of continuous fragments, having the same direction and as aligned as possible. An energy E, a weighting function of terms associated with criteria encoding the quality of the solution, makes it possible to obtain evolution equations of synaptic coefficients of the neural network. The energy E is optimized at the convergence of the network. It is possible to note the following deficiencies:

A high sensitivity to parameters. The final result is very dependent on parameters weighting the different terms of the energy equation.

Not satisfying constraints. The network optimizes one function, which globally encodes the problem, so that it is not possible to ensure that all the constraints are strictly satisfied. In other words, the solution can contain elements which do not satisfy the constraints. Thus, the final solution can be of poor quality.

Prohibitive calculating or computing time. The computing algorithm performs no preprocessing. If the image contains n attributes, the network will be formed from $n^2$ neurons, i.e. $n^4$ synaptic weights to be determined. Therefore the necessary computing or calculating times are very long. This is also the reason why this algorithm has only been used on very small problems.

An article by A. Cenedese, G. Romano, A. Paglialunga and M. Terlizzi entitled "Neural net for trajectories recognition in a flow" (Proceedings of the Sixth International Symposium on Applications of Laser Techniques to Fluid Mechanics, pp.27.1.1–27.1.5, 1992) presents a neuromimetic method for recognizing trajectories in fluid mechanics. The network used is a multilayer network based on a model supplied by the Carpenter-Grossberg classifier. In this network type, the calculation of the synaptic weights takes place without a supervisor. The algorithm functions with a sequence of images. The earning and therefore the calculation of the synaptic weights is carried out by means of a certain number of images of the sequence. The velocity field can then be determined. The neuromimetic network described in the above article is a learning network. Therefore the major disadvantage of this method is that during the sequence recording time, the operating conditions of the analyzed moving fluid must be stationary. In addition, the method requires a very long calculating or computing time and uses numerous parameters with an ad hoc estimation. Finally, at present, the algorithm proposed requires a significant validation.

An article by M. Gyulassy and M. Harlander entitled "Elastic tracking and neural network algorithms for complex pattern recognition" (Computer Physics Communications, vol.66, pp.31–46, 1991) proposes an elastic tracking algorithm for determining the trajectories of particle physics experiments. In the elastic tracking approach, a trajectory is a helical object, which is in a form bringing about optimum adaptation to the data, i.e. to the fragments. The helix can be looked upon as being electrically charged and being attracted by the fragments, which have a charge of opposite sign. The notion of elastic tracking intervenes in the calculation of synaptic weights. The neural network used is the same network as used by C. Peterson in the aforementioned article. Only the calculation of the synaptic weights is modified, each synaptic weight then taking account of the quality of the adjustable trajectory on neurons linked by said synaptic weight. This method has the same disadvantages as the C. Peterson method, i.e. sensitivity to parameters, not satisfying constraints and prohibitive calculating time.

Neuromimetic Networks

These networks have been widely studied for many years and various applications have been developed, particularly for solving shape recognition and optimization problems. Neuromimetic networks use a digital information and are systems performing calculations based on the behaviour of physiological neurons. A neuromimetic model is characterized by three basic components, namely a formal neural network, an activation rule and evolution dynamics.

The network is formed from a set of formal neurons. A formal neuron is a computing unit constituted by an input, called potential (designated u) and a output, corresponding to a digital activation level (designated p). At each instant, the activation level of each neuron is passed to the other neurons. Thus, the neurons are connected together by weighted connections, called synaptic weights. The weight of the connection between the output of the neuron i and input of the neuron j is designated $w_{ij}$. The total activation quantity at the input $u_j$ received by the neuron j from the other neurons at each instant is used by said neuron to update its output. It is sometimes called the potential or activation potential of the neuron j.

The activation rule of a neuromimetic network is a local procedure followed by each neuron when updating its activation level as a function of the activation context of the other neurons. Therefore the output of a neuron is given by a non-linear transfer function applied to the potential. This non-linear function can be a threshold function, also known as the MacCullogh and Pitts function and defined for the neuron i in question at the date t by:

$$\begin{cases} p_i(t) = 1 & \text{if } u_i(t) > 0 \\ p_i(t) = 0 & \text{if } u_i(t) < 0 \\ p_i(t) = p_i(t-1) & \text{if } u_i = 0 \end{cases} \quad (1)$$

Evolution dynamics is the rule permitting the updating of neurons. Initially (t=0), the outputs of neurons are drawn at random (0 or 1) and then the network evolves by updating its neurons. In order to update a neuron i at instant t, its potential is calculated at said date:

$$u_i(t) = u_i(t-1) + \Delta u_i(t) \quad (2)$$

The potential variation $\Delta u_i(t)$ will correspond to the evolution dynamics. Different models exist in the prior art for defining said dynamics. As a function of the sign of $\Delta u_i(t)$ between two updatings of the neuron i, it is said that the neuron is inhibited (negative potential variation) tending to place the output at 0) or excited (positive potential variation tending to place the output at 1). If its potential is strictly positive, the neuron places its output at 1 and is activated. If its potential is strictly negative it places its output at 0 and is deactivated. If its potential is 0 the value of the output remains unchanged. Thus, the output of neuron i can be induced to change between two updatings. It is said that the network has converged if, for each neuron, no updating modifies the potential of the neuron.

The convergence mode is defined by the order in which are updated the neurons. Its choice is of great importance for the convergence quality. The convergence mode can be:

asynchronous: i.e. one neuron at once, the new output calculated during its updating being used for the updating of the other neurons and the neurons can be sequentially updated in a fixed order (sequential asynchronous mode) or at random (random asynchronous mode);

synchronous: all the neurons are simultaneously updated;

synchronous by block: neuron blocks are synchronously updated.

Certain evolution dynamics designed for solving optimization problems will now be presented.

The model used as a basis for neural optimization algorithms is that presented by J. Hopfield and D. Tank in the article entitled "Neural computation of decisions in optimization problems" (Biological Cybernetics, vol.52, pp.141–152, 1985). They define an energy function E:

$$E = -\frac{1}{2} \sum_{i=1}^{n} \sum_{j=1}^{n} w_{ij} \cdot p_{ij} \cdot p_j - \Sigma I_i \cdot p_i \quad (3)$$

The neural outputs $p_i$ are analog, between 0 and 1, and $I_i$ represents an input bias. This energy can be seen as the physical energy of a spin glass system. The energy E encoding the problem, so that the problem amounts to minimizing this energy at the convergence of the network. J. Hopfield, in an article entitled "Neural networks and physical systems with emergent collective computational abilities" (Proceedings of the National Academy of Sciences, vol.79, pp.2554–2558, 1982) demonstrates in the Hopfield theorem that:

if the evolution dynamics of the network are $$\Delta u_i(t) = -\frac{\Delta E}{\Delta p_i}(t)$$

if the activation rule used is the MacCullogh-Pitts rule, and if the matrix of synaptic weights is symmetrical ($w_{ij} = w_{ji}$), then, for any neuron i and at any date t:

$$\frac{\Delta E}{\Delta t}(t) \leq 0$$

Thus, the energy will decrease, during the evolution of the system, until it reaches a minimum.

More generally, the aforementioned authors, propose for the solving of the optimization problems, the expressing of the energy as a weighted sum of a cost function and a constraint function (also called the Lagrangian function of the problem):

$$E = E_{cost} + \lambda E_{constraints}$$

The constraint energy is higher as the constraints linked with the problem are not satisfied and in the same way the cost energy quantifies the quality of the solution. This method suffers from the deficiency of not guaranteeing that the constraints are perfectly satisfied. It proposes a solution which is a compromise between the minimizing of cost and the satisfying of the constraints.

Most known trajectory determination methods generate trajectories on the basis of a priori knowledge based on the nature of recordings of trajectories (number of points, shape of the sought trajectory) and certain trajectories found are erroneous.

None of the neuromimetic methods of the prior art are able to deal with real size problems. None of these methods guarantees satisfaction of all the constraints of the problem.

The object of the invention is to propose an object trajectography process making it possible to determine local trajectories of objects which can be of similar nature to one another on the basis of recordings of spatial positions of objects at known dates which:

guarantees the satisfying of all the constraints of the problem, is applicable to any real signal of random size, and which can advantageously use an original neuromimetic network.

DESCRIPTION OF THE INVENTION

Therefore the present invention relates to a process for obtaining trajectories of moving objects, by optimizing at least one criterion of the physics of the observed phenomenon, characterized in that it comprises the following stages:

a stage of recording signals formed from characteristic fragments of positions of objects at different instants, parts of the same nature as the fragments, but which are noise, and parts attributable to noise without any possible confusion;

a stage of extracting parts of signals having the same nature as the fragments and determination of characteristics associated therewith, on the basis of a priori knowledge on their nature and on the sought trajectory;

a stage of subdividing all the parts of signals previously extracted into classes, each class representing a potential trajectory and having a predetermined number of fragments;

a stage of selecting a subset of classes satisfying constraints linked with the type of phenomenon observed and comprising:

the generation of a set of n-uplets constituted by a subset of n classes, the measurement of the compatibility of the classes assembled in n-uplets by a first analytical function determined on the basis of constraints linked with the type of phenomenon observed and the acquisition device, the measurement of the quality of the n-uplets by a second analytical function, determined on the basis of constraints linked with the phenomenon observed and the acquisition device;

a stage of selecting from among the classes representing the potential trajectories of those satisfying constraints, by a process of optimizing among the constraints of at least the preceding criterion or criteria using preceding compatibility and quality measurements, so as to obtain "real" trajectories of the objects.

Therefore the invention proposes a more robust process, because it takes account of the nature of the studied phenomena such as incompatibilities between different trajectories or the global movement of objects.

In this definition of the invention, e.g. the term "nature" of a fragment is understood to mean the shape of the corresponding signal part. This nature is known a priori. For example, in a one-dimension problem, the nature of the fragment can be likened to a peak. In a two-dimension problem, the nature can be a spot. The a priori knowledge also relates to the number of fragments constituting a trajectory and consequently a class.

With regards to the "n-uplets", n is determined as a function of the available calculating time of the number of objects, the nature of the trajectories, the velocity, etc. For example, the classes are grouped in pairs (n=2).

Advantageously, in the first stage, the position of the objects is recorded at several separate, consecutive times, separated by fixed time intervals. Advantageously, the final selection stage of subsets of mutually compatible shapes is carried out using a neural network.

Advantageously, during the recording stage, when it is possible to operate in real time, the processing of the conditioning of the signals obtained involves a substage of storing signals. These signals can be preprocessed prior to their storage.

Advantageously the process of the invention can be used for extracting given shapes in a noisy environment.

The invention also relates to a device for performing this process and characterized in that it comprises:

a recording device, a characteristic extraction module, a potential trajectory generating module, a problem shaping module, an optimization problem, resolution module.

Advantageously, the recording device comprises:

a signal sampling stage, an acquisition stage a recording stage.

Advantageously, the device comprises a neural network. In a first embodiment, the neural network comprises:

a first table memory for the outputs pi of neurons receiving the output of a circuit for drawing or choosing an integer from 1 to N, a second memory of the relations between the objects, a third table memory of potentials of neurons, a fourth table memory of the final variations of potentials of neurons, a first computing circuit making it possible to compute $A \cdot p_i \cdot T(\{p_j\})$, a second computing circuit making it possible to compute $B \cdot (1-p_i) \cdot S(\{p_j\})$, a third computing circuit making it possible to compute $C \cdot R(\{p_j\})$, these three computing circuits being connected to the outputs of the two first memories;

an interruption device connected to the output of the third computing circuit and the outputs of the fourth memory, a first adder receiving the outputs of the first two computing circuits and the interruption device, a second adder receiving the outputs of the third memory and the first adder, a thresholding function circuit having a binary output receiving the output of the second adder.

In a second embodiment, the neural network comprises:

a circuit of drawing or choosing an integer between 1 and N, a first table memory of the values of the outputs $p_i$ of the neurons, a second memory listing neighbours of each neuron, a third memory for relations between the objects, a fourth memory of the potentials of neurons, a fifth memory containing the current value of the quality function E, a first computing circuit making it possible to compute the potential variation to be applied to the neuron i, a second computing circuit making it possible to compute the potential variation to be applied to neighbouring neurons of the neuron i, a first adder receiving the outputs of the first computing circuit and the fourth memory, at least one second adder receiving the outputs of the second computing circuit and the fourth memory, at least two binary thresholding function circuits F respectively connected to the outputs of said two adders.

By the formalization of the problem in the form of a global optimization problem under constraints and using the described neuromimetic networks, it is possible to guarantee a good quality of the solution retained, which has not been achieved up to now by the prior art methods.

Compared with the prior art, the invention combines the following advantages:

the quality of the results is only very slightly dependent on the parameters (weighting coefficients of the constraints $\lambda_k$, parameters inherent in each function of strict constraints $f_k(i,j)$ Or each criterion $g_k(i,j)$) and these coefficients do not have to be finely adjusted;

the process of the invention uses the properties and characteristics of the studied phenomenon, so that the solution is correctly controlled;

the inherent strict constraints of the studied phenomenon are absolutely satisfied and at the network convergence, the satisfying of all the constraints is guaranteed;

the digital calculations within the planning module only require simple logic and arithmetic operations (+,−,*,/, comparisons), due to the fact that the neurons used are of a binary nature, which permits the production of specific hardware;

the convergence speed is very fast.

BRIEF DESCRIPTION OF THE DRAWINGS

FIG. 1 Illustrates the different stages of the process according to the invention.

FIGS. 2, 3 and 4 Illustrate the device for performing the process of the invention.

FIGS. 5 and 6 Illustrate a neuron and a first neural network associated with the device for performing the process of the invention.

FIGS. 8, 9, 10 and 11 Illustrate an example of the results of the different processing operations performed in the process of the invention.

DETAILED DESCRIPTION OF EMBODIMENTS

Figure 7A:
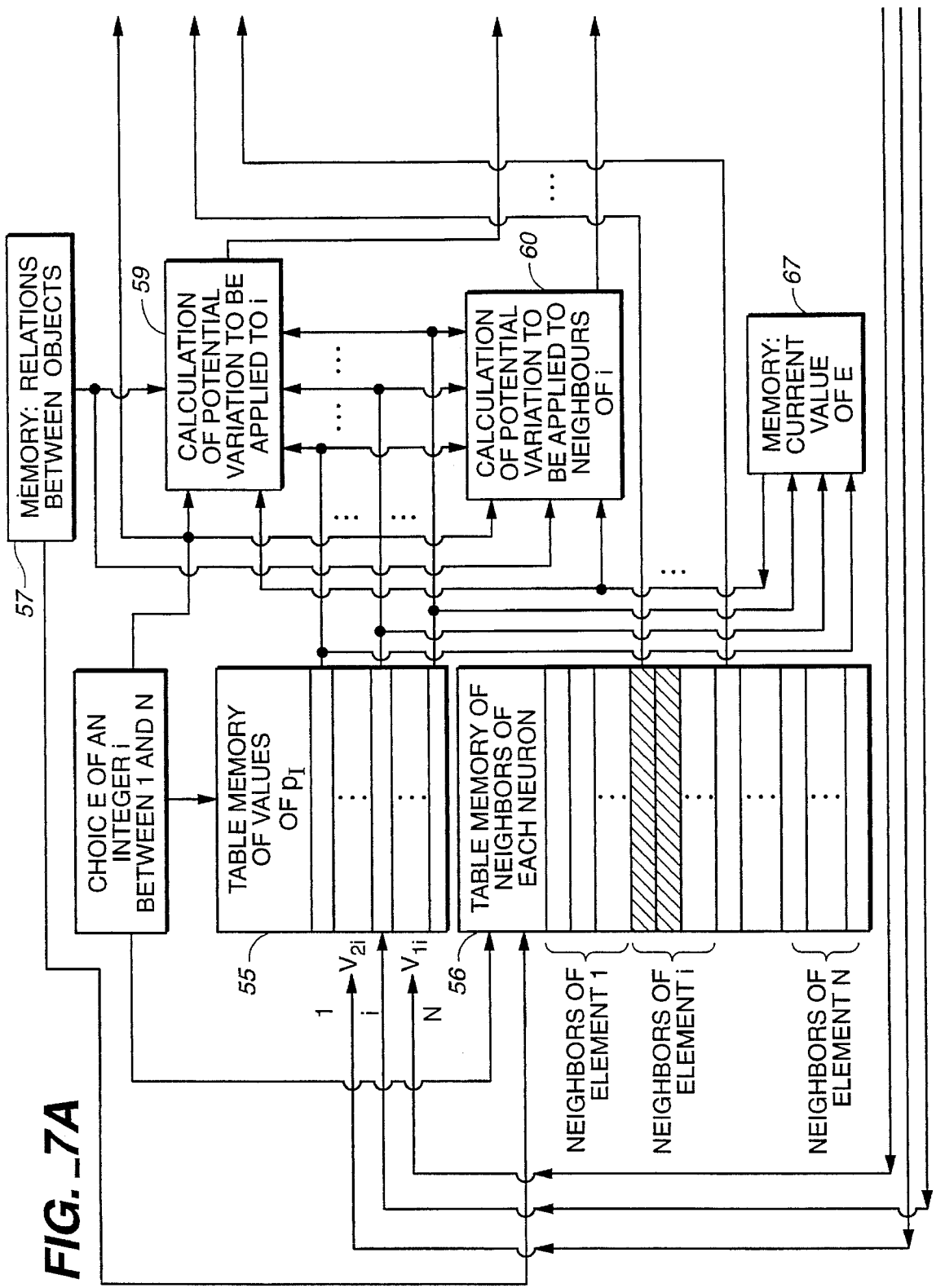
FIG. 7 Illustrates a second neural network associated with the device for performing the process of the invention.

The lexicon at the end of the description forms part of the latter.

The process of the invention comprises the five stages illustrated by FIG. 1.

In a first stage 10, the signals are recorded. These signals are called fragments. They represent the recording of the trajectories of objects, each trajectory being constituted by a time succession of fragments.

A second stage 11 of the process consists of extracting the characteristics (positions, shapes, etc.) of these various fragments. The knowledge of the studied phenomenon and the recording device give a priori information on the nature of the fragments and on the sought trajectories.

In a third stage 12 the a priori information on the fragments permit the segmentation of all the fragments into classes, each of them being characteristic of a potential trajectory of an object. A particular class corresponds to fragments which the process has not associated with objects. All the fragments of this class are looked upon as noise in the signal processing sense. At this stage of the process, the classes are not necessarily non-contiguous in pairs. A certain number of trajectories or classes are erroneous. The remainder of the process serves to determine and eliminate them. The number of potential trajectories satisfying the constraints linked with the recording increases exponentially with the number of objects and with the number of fragments recorded for each object.

In order to eliminate the classes from the third stage and which do not correspond to real object trajectories, a fourth stage 13, 14 aims at defining an optimization problem, whose solution corresponds to real object trajectories. The knowledge of the studied problem and the recording device makes it possible to define a function to be maximized and constraints which must be satisfied by the solution. The function measures a global quality of the trajectories retained by the process. It is calculated on the basis of quality measurements of each possible class pair. The identification of the object trajectories by grouping fragments can then be seen as seeking, among the set of potential trajectories, subsets of potential trajectories satisfying a set of constraints and whose interpretation maximizes a quality function. This is a global optimization problem under constraints.

The exemplified use of a neuromimetic network constitutes the fifth stage of the process. It makes it possible to solve this problem rapidly, guaranteeing the satisfying of all the constraints and whilst optimizing the quality of the solution.

The final result found supplies the identification of the trajectories effectively present in the initial signals.

Thus, the process of the invention uses the following context:

the studied phenomenon, the characteristics of the studied phenomenon, the characteristics of the recording device, a function of measuring the satisfaction of the constraints by trajectory pairs, a function of measuring the quality of the grouping of two trajectories, a function of measuring the global quality of the trajectories retained.

The studied phenomena can e.g. be constituted by:

A fluid flow, by velocimetry by particle imaging. In order to analyze the behaviour of a fluid, the latter is seeded with particles, which will follow the fluid. On an image is recorded the displacement of the particles present in a fluid. On the basis of displacement fragments, the trajectory of each particle is determined and the characteristics of the studied phenomenon are determined. Applications exist in fluid mechanics (velocimetry by particle imaging) in high energy physics (tracking particles) and in any discipline using the tracking of objects or the identification of trajectories.

Collisions of particles in particle physics. For example, a three-dimensional matrix of wires is inserted in the experimental chamber, said electric wires having the characteristic of detecting any passage of ionized particles. The signals record time pulses (i.e. diracs) relating to the passage of particles through said linking matrix. It is a question of reconstituting trajectories on the basis of these time pulses.

Any phenomenon requiring a tracking of object trajectories.

The characteristics of the studied phenomenon correspond to the physical laws governing the expected trajectories and characteristics existing between trajectories and e.g. constituted by:

the macroscopic characteristics of a fluid, the characteristics of a particle flow, the nature of objects, the nature of sought local trajectories (linear, circular, etc.), the compatibilities or incompatibilities between trajectories resulting from hypotheses on phenomena, depending on whether or not it is assumed that objects can subdivide, the presence of particular zones (e.g. eddies).

The characteristics of the recording device are linked with the type of recording device used. These characteristics supply a set of constraints.

The function of measuring the satisfying of constraints of a pair of trajectories makes it possible, on the basis of the characteristics of the recording device and the studied phenomenon, to analyze and quantify the way in which each pair of trajectories found after stage 12 of the process according to the invention satisfies the constraints linked with the characteristics of the recording device and the studied phenomenon.

The function of measuring the quality of a pair of trajectories uses certain characteristics of the recording device and the studied phenomenon. On the basis of these characteristics, it evaluates the quality of each pair of trajectories found at the end of stage 12.

The global quality of the interpretation is measured by a function of the quality measurements, calculated for each pair of trajectories.

The device for performing the process according to the invention as shown in FIG. 2 comprises the following:

A recording device 20 used for the acquisition and recording of the studied phenomenon in the form of signals S.

A module 21 for extracting the characteristics of fragments constituting the trajectories of objects, on the basis of the signals. It supplies the list of fragmentary elements present in the signals and their characteristics.

A module 22 for generating potential trajectories on the basis of the list of fragments and characteristics of the recording device and the studied phenomenon.

A module 23 for shaping the problem like an optimization problem. The constraints on the solution are defined in the following way: for each potential trajectory, a determination is made to establish with which other potential trajectories it is incompatible. The function to be maximized makes it necessary to calculate a quality factor with each compatible potential trajectory. This module will use two functions, namely a function measuring the satisfying of the constraints and a function measuring the quality of the pairs of trajectories. It generates the list of pairs of trajectories which are mutually incompatible and the list of quality measurements of the pairs of trajectories.

A module 24 for solving the optimization problem under constraints. This module serves to find, among the potential trajectories extracted by the potential trajectory generating module 22, a subset of potential trajectories which are pairwise compatible, said subset maximizing a function called the global interpretation quality of the quality coefficients defined for each pair of trajectories. A distinction can be made between two cases, namely either the qualities of the pairs of compatible trajectories are binary and then the problem amounts to seeking the largest set of mutually compatible, potential trajectories, or the qualities of the pairs of compatible trajectories are real numbers between 0 and 1.

Advantageously neuromimetic networks are used for solving the optimization problem.

Depending on the particular case involved, the neuromimetic network solving the problem differs, in terms of neuron potential updating equations, dynamics and the associated device.

Each of the stages of the process according to the invention will now be studied.

Signal Recording Stage (10).

The function of the recording device 20 is to acquire and record the studied phenomenon, in the form of signals containing fragmentary informations of trajectories of objects present in the studied phenomenon and it is shown in FIG. 3.

The signals recorded can be of two types:

either the recordings at the various dates are all recorded on the same support (which increases the complexity of the problem), the support e.g. being an image, an electrical signal, a photograph, etc.;

or the recordings at the different dates are made on separate supports, the support being e.g. a sequence of images (one image per recording date) or a matrix of electrical signals.

These signals will contain fragments of trajectories to be reconstituted. These fragments can be points, spots, straight segments, parametrized curved portions, time pulses (diracs, etc.).

The recording device 20 incorporates a first stage, namely the signal acquisition stage 30. As a function of the recorded signal type, the acquisition stage can be a CCD, a video camera, an infrared camera, or any image sensor, or even an electronic device, etc.

It incorporates a second stage, namely the signal recording stage 31 which differs as a function of the recorded signal type. For example in the case of signals of the image type, digitization and storage of the signals making it possible to obtain digital signals and in the case of signals of the electrical type, compression and storage.

With regards to the acquisition rate of the system corresponding to the acquisition stage, preference is given to a rate having the same order of magnitude as the phenomenon which it is wished to study, e.g. for identifying a displacement trajectory which can be seen by the eye, the acquisition rate will be approximately 25 images per second. The acquisition rate is decreased for detecting slow movements. For detecting very fast movements, higher acquisition rates are used.

In addition, a supplementary stage is sometimes necessary as a function of the application type, namely the phenomenon sampling stage 32. For recording fragments of object trajectories, it may be necessary to sample the phenomenon at a known frequency. For example, in velocimetry by particle imaging, recording takes place of a succession of fragments of trajectories of particles present in the analyzed fluid. The sampling frequency can vary in time and the delays between two successive recordings can differ. For example, in particle imagining velocimetry, this makes it possible to determine the sense or direction of the speed of each object. Fragments of trajectories will make it possible to induce characteristics (position, velocity, velocity direction, etc.) of particles at instants where each fragment is recorded. The sampling stage of the phenomenon can be directly linked to the acquisition system (the camera sampling the movement on recording a sequence of images and in the same way for the matrix of electronic wires of high energy physics electrical detectors) and a device makes it possible to illuminate the studied phenomenon in timed manner and record the movement of the objects at the illumination rate. Thus, the fragments of the trajectories are recorded at the illumination times. In practice, it is e.g. possible to use pulsed lasers, masks placed in front of a constant white light source making it possible to stroboscope the light, etc.

The recording device supplies a set of characteristics referred to as the characteristics of the recording device. These characteristics supply information on:

the nature of the recorded fragments (e.g. points, spots, ellipsoids, segments, parametrized curved arcs, time pulses);

the number of fragments recorded for each trajectory (e.g. the number of fragments recorded for each trajectory of particles in a particle imaging velocimetry application);

the dimension of the recorded fragments.

Signal Fragment Extraction Stage (11)

The signal recorded by the recording device contains the fragments of trajectories to be recognized. The signal fragment extraction module 21 serves to extract from signals recorded with the recording device, all the fragments contained in these signals. A list of fragments and their characteristics will be supplied at the output of this module.

The fragment extraction methods will vary as a function of the processed signal type and the expected fragment type. For example, use can be made of filtering methods, segmenting methods, binarizing methods, centre of gravity search methods using connectivity searches, analysis methods with respect to shapes on the basis of inertia moments, methods of extracting parametrized objects (segments, points, etc.), grey level histogram analysis methods, smoothing methods, methods of adjusting data by parametrized functions, methods using texture information, etc.

The characteristics which can be allocated to each fragment are e.g. the position, analytical type parameters (examples: radius of a circle, side length of a square), the average grey level, length, orientation, etc.

Potential Trajectory Generating Stage (12)

The potential trajectory generating module 22 receives at the input a list of fragments and their respective characteristics, as well as the characteristics of the recording device and the characteristics of the studied phenomenon. The object of this module is to reconstitute, on the basis of these data, potential trajectories. A trajectory is defined as a class of fragments. In other words, a shape is constituted by a group of fragments satisfying the constraints linked with the characteristics of the recording device and with the characteristics of the studied phenomenon.

If a trajectory is formed from p fragments (p being a characteristic of the recording device) and if n fragments (n>p) have been extracted from the signals by the fragment extraction module among the $C_n^p$ groups of p fragments, only an unknown number a priori x of groups satisfies the constraints linked with the characteristics of the recording device and with the characteristics of the studied phenomenon. In order to avoid the exhaustive enumeration of the $C_n^p$ groups, the search within the group of fragments can e.g. be reduced in the following way:

Searching in given vicinities, it being considered that only the spatially or time close fragments (as a function of the application) can be grouped. Thus, considering a given fragment, consideration will only be given to the fragments present in a certain vicinity centred thereon. Among these fragments, only those satisfying the constraints will be retained.

Linear displacement extrapolation, e.g. in a particle imaging velocimetry application, using a sequence of images, whereby a linear displacement extrapolation during a stage is used as a path approximation in the following stage. In the stage i+1, the positions of the particles are scanned for seeking particles not yet assigned within an interval around the extrapolated position, on the basis of the knowledge of the displacement determined between i−1 and the stage i.

The following methods can e.g. be used for grouping the fragments into classes and for merging them into trajectories:

Methods using branch-and-bound search strategies. In order to reduce the search space of all the possible combinations of fragments, it is possible to establish heuristics linked with the constraints. These heuristics will make it possible to establish which types of combinations cannot be envisaged.

Methods using specialized neural networks for combinatory optimization problems. The energy function which the network will be required to minimize transcribes the constraints and will be in inverse proportion to the combinations retained satisfying the constraints linked with the recording device and the studied phenomenon.

Or any other method making it possible to select from among the $C_n^p$ possible combinations the x fragment groupings satisfying the constraints.

Thus, on the basis of the a priori knowledge of the characteristics of the studied phenomenon and the recording device and also on the basis of the list of fragments extracted from the recorded signals, it will be possible to generate a set of potential trajectories.

However, these local constraints can lead to the generation of trajectories satisfying constraints, but which are erroneous in the sense of the studied phenomenon. In other words, classes of fragments may not be trajectories of objects effectively present in the studied phenomenon.

As far as we know, all the processes stop at this stage, no matter what the methods used by them and sometimes their results are improved by smoothing, averaging and interpolating values. The originality of the process described in the present invention is based on the fact that:

it implements complementary modules in order to improve the proposed interpretation quality:
module of measuring compatibilities or incompatibilities and the quality of a set of trajectories,
module of seeking a set of mutually compatible trajectories, whose interpretation has a maximum quality;

these modules discriminate classes of erroneous fragments compared with those corresponding to trajectories of objects effectively present in the studied phenomenon.

Stage of Determining Constraints and Calculating Qualities Between Pairs of Signals (13, 14)

The knowledge of the phenomenon studied and the data recording device supplies a certain number of data on expected object trajectories and from same are deduced strict constraints, so-called compatibility or incompatibility constraints (binary, all or nothing) which must be satisfied by any pair of trajectories in the solution and criteria making it possible to quantify the way in which a pair of potential trajectories contributes to the quality of the interpretation resulting from their belonging to the solution.

The strict constraints are constraints relating to pairs of trajectories and binary values. They define compatibilities or incompatibilities able to exist between trajectories of objects, e.g.:

- in fluid mechanics flow, two very close together particles unable to move in an opposite direction, i.e. corresponding trajectories cannot have opposite directions;
- in particle imaging velocimetry, it can be considered that two trajectories constituted by n points (where each point is the position of the considered particle at a given instant) cannot have a common point;
- in an electronic detector wire chamber in particle physics, a particle and the trajectory corresponding thereto can only pass in a given direction.

These constraints are represented by the functions $f_k(i,j)$ of the characteristics of the trajectories i and j.

The knowledge of the studied phenomenon and the recording device supplies information on the relations able to exist between trajectories, so that e.g.:

- in fluid mechanics, oceanography or meteorology, two adjacent particles must have similar speeds and in particular in fluid mechanics this property will increase as the fluid viscosity increases,
- in the same disciplines, it is found that particles belonging to the same structures (laminar part of a flow, eddy) have the same centre of curvature;
- in particle physics, the signals from electronic particle detectors supply information that the curve associated with the trajectory of a particle has an often known analytical shape.

When put into practical application, it is considered, in the terms of the potential trajectory generating module, that N trajectories have been generated. FIG. 4 shows the application of the incompatibility measuring module and the quality between pairs of signals.

Definition takes place of a measurement function of the satisfaction of the constraints $F_1(i,j)$ for the n-uplet, e.g. the pair of trajectories (i,j). This function has binary values indicating either the compatibility ($F_1(i,j)=0$) or the incompatibility ($F_1(i,j)=1$) between the trajectories i and j. It is defined between the neighbouring potential trajectories i and j, V(i) being a vicinity of i. This function is e.g. written:

$$F_1(i,j) = \prod_{k=1}^{C_1} f_k(i,j) \quad (4)$$

in which $f_k(i,j)$ is the function of the strict constraints associated with the constraint k. For example, the functions of the strict constraints could be:

$$f_1(i,j) = \begin{cases} 0 & \text{if } i \cdot j \geq 0 \\ 1 & \text{if not} \end{cases} \quad (5)$$

in which i and j are vectors respectively representing the fragments i and j. If i and j have opposite senses, then the value returned by $f_1(i,j)$ is 1 and the fragments i and j are incompatible:

$$f_2(i,j) = \begin{cases} 1 & \text{if the fragments } i \text{ and } j \text{ share a point} \\ 0 & \text{if not} \end{cases} \quad (6)$$

In the case of a particle imaging velocimetry application, if the fragments i and j share a point, they are said to be incompatible.

The quality factory between several, e.g. two compatible trajectories i and j is measured by a function $F_2$. It returns a real value between 0 and 1, which is higher the greater the probability of a pair of trajectories (i,j) belonging to a maximum quality interpretation solution. In other words $F_2(i,j)$ will be higher as the trajectories (i,j) are trajectories of objects effectively present in the studied phenomenon. This function is defined by:

$$F_2(i,j) = \sum_{k=1}^{C_2} \lambda_k \cdot g_k(i,j) \quad (7)$$

in which $g_k(i,j)$ is a function relative to the criterion k and $F_2(i,j) \in [0,1]$. This term tends to be higher as the trajectories (i,j) are coherent in the sense of the studied phenomenon. The coefficients $\lambda_k$ are non-zero, real positive numbers, which weight the significance of the criteria. For example, it is possible to have for the expression of the criteria:

in application to particle imagining velocimetry:

$$g_1(i,j) = 1 - \frac{\Gamma(\theta_i, \theta_j)}{\pi/2} \quad (8)$$

where:

$\theta_i$ and $\theta_j$ are orientations of potential trajectories i and j, $\Gamma(\theta_i, \theta_j)$ is the internal angle formed by the trajectories (straight segments) i and j.

This expression gives preference to the pairs of trajectories which are most aligned:

$$g_2(i,j) = e^{-\frac{d_{ij}^2}{2\cdot\alpha}} \quad (9)$$

in which $d_{ij}$ is the distance between the trajectories i and j and $\alpha$ is a coefficient proportional to the variance measured on the distances between all the extracted trajectories. This function will give preference to objects close to one another:

in the application in the case of particle physics:

$$g_3(i,j) = \frac{\cos^n \theta_{ij}}{r_{ij}} \quad (10)$$

where $\theta_{ij}$ is the angle between the trajectories i and j, $r_{ij}$ is the length of the sum vector of the segments i and j and n is an integer. This function gives preference to trajectories constituted by short segments and which follow smooth curves.

If it is wished to manipulate binary numbers (in order to simplify the resolution of problems in the following stages), it is appropriate to binarize, in a supplementary stage, the measurements returned by $F_2$.

The functions $F_1(i,j)$ and $F_2(i,j)$ respectively make it possible to determine the incompatibility or compatibility existing between the trajectories i and j and to measure the coherence between the trajectories i and j with respect to the studied phenomenon.

In the stage of formalizing the problem in the form of a global optimization problem under constraints, there is a list of potential trajectories, the list of the pairs of mutually incompatible trajectories (in the sense of the studied phenomenon and the recording device) and the measurement of the quality of each pair trajectories. The interpretation retained at the end of the process must only include the object trajectories effectively present in the studied phenomenon. However, the above-defined constraints have made it possible to establish a list of pairs of potential trajectories, so that each trajectory of the given pair cannot be retained in the solution if the other trajectory has been retained in it, i.e. the list of mutually incompatible potential trajectories. They have also made it possible to quantify the quality of each pair of trajectories. Two cases must then be considered:

Case where $F_2$ returns binary values. In this case, if for two trajectories i and j, $F_2(i,j)=0$, it is considered that the trajectories i and j are incompatible. The problem then amounts to seeking the largest set of mutually compatible trajectories, or in other words the largest independent subgraph of the graph of incompatibilities, whose nodes are potential trajectories and whose edges express incompatibilities.

Case where $F_2$ returns real values (e.g. between 0 and 1). On considering x trajectories among the N potential trajectories, definition is made of a quality function $F_q$ of the interpretation of the selected trajectories using quality measurements for each pair of trajectories. $F_q$ is defined in such a way that it has a higher value when, among selected potential trajectories many of the said trajectories are effective trajectories.

Seeking a solution only containing trajectories effectively present in the studied phenomenon amounts to seeking trajectories which are all compatible with one another and which contribute to maximizing the quality measurement $F_q$. This is a global optimization problem under constraints. For example, it is possible to choose for $F_q$:

$$F_q = \sum_{i=1}^{N} \sum_{j=1}^{N} F_2(i,j) \cdot p_i \cdot p_j \quad (11)$$

in which $F_2(i,j)$ is the measurement function of the quality of a pair of trajectories (i,j) and $p_i=1$ if the trajectory i is selected as forming part of the solution retained. In summarizing, the problem can be expressed as the search, among N generated potential trajectories, for the subset of trajectories maximizing the quality function $F_q$, which is a function of $F_2(i,j)$ and satisfying the constraints:

$$\forall (i,j) \in <1,N>^2, p_i = p_j = 1 \Rightarrow F_1(i,j) = F_1(j,i) = 0.$$

Stage of Solving the Optimization Problem Under Constraints (15)

In the fifth stage, the optimization problem defined in stages 13 and 14 is solved and two cases are to be considered.
a) The Quality Factors $F_2(i,j)$ are Binary Use is made of a first formal neural network able to determine a subset of potential trajectories in pairs, which are not incompatible and of maximum quality, where the quality is measured as the number of potential trajectories in the subset found. The following stages occur:

1) Construction of a recursive neural network on the basis of potential trajectories and relations between the potential trajectories by associating with each potential trajectory the binary output of a formal neuron $p_i(t)$:

$p_i(t) = 1 \Rightarrow$ the potential trajectory belongs to the sought subset, $p_i(t) = 0 \Rightarrow$ the potential trajectory does not belong to the sought subset.

2) Use of an interruption process in order to obtain subsets of potential trajectories in pairs and related so that each subset found cannot be included in a larger subset containing it. There is a passage from one subset to the other on attempting to increase its size.

3) Initialization of the output (e.g. at zero) and the potential of each neuron in such a way that, for each neuron i, they prove:

$p_i(t) = 1 \Leftrightarrow u_i(t=0) \geq 0$ $p_i(t) = 0 \Leftrightarrow u_i(t=1) \leq 0$ 4) Recursive dynamic operation of the network: there is an asynchronous updating (e.g. random or sequential) of the set of neurons of the network in a certain order, by successively scanning the neurons by applying to their potential a previously calculated correction, which is dependent on the values of the outputs of the other neurons and relations existing between the potential trajectories. Whenever the network has converged, following the decoding of the outputs of the neurons a subset of potential trajectories in pairs and not incompatible is obtained (i.e. pairwise compatible), which is stored. Globally, following the decoding of the outputs of the neurons, a list is obtained of the subsets of potential trajectories in pairs and not related, each of said subsets not being includable in a larger subset.

5) Choice of the largest among the listed subsets by size comparison.

Recursive Dynamic Operation of This First Neural Network

Determination takes place of the correction to be applied to the potential $u_i$ of a neuron i at a date t. It is given by a linear combination of two terms:

one term serving to inhibit the neuron i if the latter is activated and the associated potential trajectory is incompatible with at least one of the potential trajectories corresponding to the neurons activated at the date where it is considered. In other words, if the output $p_i$ of the neuron i at the date t is $1(p_i(t)=1)$, then this correction is given by:

$p_i(t) \cdot T(\{p_j(t)\})$ where T is a function of the outputs $p_j(t)$ of the neurons at the date t, which correspond to potential trajectories incompatible with the potential trajectory associated with the neuron i, e.g.:

$$T(\{p_j(t)\}) = -1 + h\left(\sum_{j=1}^{N} e_{ij} \cdot p_j(t)\right)$$

with N the number of potential trajectories $e_{ij}=1$ if the potential trajectories i and j are incompatible $e_{ij}=0$ if the potential trajectories i and j are not incompatible (i.e. are compatible)

$h: R \rightarrow \{0,1\}$ $\cdot x \rightarrow h(x) \quad = 1 \quad \text{if } x = 0$ $\quad\quad\quad\quad\quad\quad = 0 \quad \text{if } x \neq 0$ or:

$$T(\{p_j(t)\}) = -\left(\sum_{j=1}^{N} e_{ij} \cdot p_j(t)\right)/deg(i)$$

where deg(i) is the number of potential trajectories with which the potential trajectory i is incompatible;

one term serves to excite the neuron if the latter is deactivated and the associated potential trajectory is not incompatible with all the potential trajectories corresponding to the neurons activated at the date where it is considered. In other words, if the output $P_i$ of the neuron i in question is 0 at the date $t(p_i(t)=0)$, then said correction is given by:

$$(1-p_i(t)) \cdot S(\{p_j(t)\})$$

in which S is a function of the outputs $p_j(t)$ of the other neurons at the date t, which correspond to potential trajectories incompatible with the potential trajectory associated with the neuron i, e.g.:

$$S(\{p_j(t)\}) = h \sum_{j=1}^{N} e_{ij} \cdot p_j(t)$$

$h:/R \rightarrow \{0,1\}$ /R being the set of real numbers $$x \rightarrow h(x) = 1 \text{ if } x = 0$$
$$= 0 \text{ if } x \neq 0$$

then, if the network has been updated less than a certain number of times previously fixed since the last convergence, then application takes place of a an excitation in order to attempt to increase, at the following convergence, the size of the subset of potential trajectories determined during the last convergence of the network.

An interruption process stops the taking into account of said excitation, which can be written in the form:

$$\delta(\Delta u_1, \ldots, \Delta u_N, t) \cdot R(\{p_j(t)\})$$

For example:

$$\delta(\Delta u_1, \ldots, \Delta u_N, t) \cdot (1-p_i(t)) \cdot l(N-deg(i), \{p_j(t)\})$$

where:

δ returns 1 if the neural network has been updated less than a certain number of times fixed since the last convergence, l returns 1 if N−deg(i) exceeds the largest size of the subsets of potential trajectories found up to the date t, 0 if not.

Thus, the network alternates pulsation phases (when said latter excitation is taken into account) and relaxation phases (when the interruption process stops the taking into account of the excitation). The network converges during the relaxation phase. Once the network has converged, an excitation is again applied (pulsation phase).

Thus, the pulsation and relaxation phases are alternated a certain number of times fixed by the user (as a function of the time which he has to find a solution with the quality for the solution which he seeks). At the end of each relaxation phase (on convergence), the neurons whose output is equal to 1 encode a subset of potential trajectories in pairs and not incompatible, i.e. which are pairwise compatible.

In general terms, the potential variation equations can be written for any i belonging to {1,N}:

$$\Delta u_i(t) = A \cdot p_i(t) \cdot T(\{p_j(t)\}) + B \cdot (1-p_i(t)) \cdot S(\{p_j(t)\})$$
$$+ C \cdot \delta(\Delta u_1, \ldots \Delta u_N, t) \cdot R(\{p_j(t)\})$$

in which A, B and C are positive real numbers. Advantageously, one takes A=B=C=1.

Advantageously, the potential of each neuron is limited between two values fixed by the user in order to speed up convergence, e.g.:

the potential is limited between the values of the order of magnitude of corrections to be applied to the potential when the neuron is updated;

the values of the potentials are limited between $-10^{-\infty}$ and $10^{-\infty}$, so that any strictly negative correction to be applied to the potential of an activated neuron deactivates it and any strictly positive correction to be applied to the potential of a deactivated neuron activates it.

FIG. 5 illustrates a neuron i. FIG. 6 gives a first neural network associated with the device for performing the process of the invention.

This first network comprises:

a first table memory 40 for the outputs pi of neurons receiving the output of a circuit 39 for drawing or choosing an integer from 1 to N, a second memory 41 of the relations between the objects, a third table memory 42 of potentials of neurons, a fourth table memory 51 of the final variations of potentials of neurons, a first computing circuit 43 making it possible to compute $A \cdot p_i \cdot T(\{p_j\})$, a second computing circuit 44 making it possible to compute $B \cdot (1-p_i) \cdot S(\{p_j\})$, a third computing circuit 45 making it possible to compute $C \cdot R(\{p_j\})$, these three computing circuits being connected to the outputs of the two first memories;

an interruption device 46 connected to the output of the third computing circuit and the outputs of the fourth memory, a first adder 47 receiving the outputs of the first two computing circuits and the interruption device, a second adder 48 receiving the outputs of the third memory and the first adder, a thresholding function circuit having a binary output 49 receiving the output of the second adder.

This network also comprises a clock 50 connected to a random generator 51 connected to a circuit 39 for choosing an integer from 1 to N. The neural network evolves in the asynchronous mode, one neuron being updated at once.

It can be demonstrated that a neural network defined in this way converges (i.e. there is a date t for which $\forall i, \forall t'>t, \Delta u_i(t')=0$), in the asynchronous mode at the end of each relaxation phase and that at convergence all the strict constraints are satisfied.

b) The Quality Factors are Real Numbers

Use is made of a second formal neural network able to determine a subset of potential trajectories in pairs and not incompatible and having an optimum quality, where the quality is measured by a random function $E(\{p_i\})$ of the outputs of the neurons. The following stages are involved:

1) Construction of a recursive neural network on the basis of potential trajectories and relations between the potential trajectories by associating with each potential trajectory the binary output of a formal neuron $p_i(t)$:

$p_i(t) = 1 \Rightarrow$ the potential trajectory belongs to the sought subset, $p_i(t) = 0 \Rightarrow$ the potential trajectory does not belong to the sought subset.

2) Use of an inhibiting process in order to obtain subsets of potential trajectories in pairs and not incompatible. Passage from one subset to another takes place by attempting to increase the quality of the solution.

3) Initializing the output and the potential associated with each neuron in such a way that, for each neuron, they prove the following conditions:

on the outputs of the neurons: on initializing a neuron i with an output representing 1 (activated neuron), whereas the neurons j corresponding to potential trajectories incompatible with the potential trajectory i ($e_{ij}=1$) must be deactivated:

$$(p_i(t=0)=1 \Rightarrow (\forall_j \in \{1,\ldots,N\} e_{ij}=1 \Rightarrow p_j(t=0)=0)$$

on the potentials $$p_i(t=0)=1 \Leftrightarrow u_i(t=0) \geq 0$$

$$p_i(t=0)=0 \Leftrightarrow u_i(t=0) \leq 0$$

4) Recursive dynamic operation of the network: there is an updating of the set of neurons of the network in a certain order (e.g. random or sequential) simultaneously considering the neurons of a block constituted by a neuron i (centre) and neighbouring neurons associated with potential trajectories incompatible with the potential trajectory i (neurons j for which $e_{ij}=1$).

For updating this block, simultaneous application takes place to the potentials of the neurons of the block of corrections dependent on the values of the outputs of the other neurons and relations existing between the potential trajectories. The mathematical expression of the correction to be applied to the potential of a neuron differs as a function of whether it is considered as the centre of a block or as the neighbour of a centre of another block.

The corrections are defined in such a way that as soon as a neuron i is activated, all the neurons j proving $e_{ij}=1$ are deactivated at the same time.

Dynamic operation generates subsets of potential trajectories in pairs and not incompatible (i.e. pairwise compatible), each of the subsets being associatable with a local maximum of the quality function.

On each occasion when the network has converged, following the decoding of the outputs of the neurons, a subset of potential trajectories in pairs and not incompatible is obtained (i.e. pairwise compatible), locally maximizing the quality function. Each of these subsets is stored. Globally a list of solution subsets is obtained.

5) Choice of the best among the listed subsets by comparison of qualities.

Recursive Dynamic Operation of This Second Neural Network

Updating takes place of the "block" of neurons (i and neurons j incompatible with i) synchronously corresponding (all the neurons of the block are updated simultaneously) considering the neuron i as the "centre" of the block and the neurons j as "neighbours" of the centre.

Thus, dynamic operation consists of scanning all the blocks of neurons in a certain order (asynchronous dynamics) and updating the neurons of each block in a synchronous manner. Reference is made to synchronous dynamics per block or block-synchronous.

Determination of the Correction to Be Applied to the Potential $u_i$ of a Neuron i at a Date t It differs as a function of whether the neuron whose potential is to be corrected is considered as being the centre of a block or as a neighbour of another centre.

On considering a block of neurons of centre i and neighbours V={j} (for any j in V, $e_{ij}=1$) at date t, it is established whether the neuron i is activated or not:

if the neuron i is activated, the block is left unchanged, if the neuron i is deactivated, the following stages are performed:

the value of the measurement of the quality obtained at the date t−1:$E(\{p_j(t-1)\}$ is stored, the following evolution of the network is tested, the neuron i being activated and the neighbouring neurons j deactivated if the latter are activated and from it is deduced the variation of the measurement of the corresponding quality $\Delta E(\{p_j(t-1)\}$.

A) The correction to be applied to the potential of the neuron i is given by a linear combination of two terms:

one term which has the object of exciting the neuron i, if it is deactivated, with a certain probability as a function of the value of $\Delta E(\{p_j(t-1)\})$, e.g. the excitation can be given by:

$\max(0, \Delta(\{p_j(t-1)\}))$, $(1-p_i(t)) \cdot \max(0, \Delta E(\{p_j(t-1)\}))$, a Metropolis procedure at a certain temperature in a simulated annealing method, a Creutz procedure at a certain energy in a microcanonic annealing method.

If the network has been updated less than a certain number of times since the last convergence, then application takes place of an inhibition in order to attempt to increase, at the following convergence, the quality of the subset of potential trajectories determined during the last convergence of the network. An interruption process stops the taking into account of said inhibition.

For example, said inhibition can consist of:

inhibiting a certain number of neurons, fixed by the user and taken at random, inhibiting a random number of neurons taken in random manner, inhibiting neurons among those corresponding to potential trajectories incompatible with many others.

Globally, the network alternates the pulsation phases (when the latter inhibition is taken into account) and the relaxation phases (when the interruption process stops the taking into account of the inhibition). During the relaxation phase the network converges. Once the network has converged, an inhibition is again applied (pulsation phase). Thus, the pulsation and relaxation phases are alternated a certain number of times, which is fixed by the user (as a function of the time he has for finding a solution and the quality of the solution which he seeks). At the end of each relaxation phase, i.e. at each convergence, the neurons with an output equal to 1 encode a subset of potential trajectories in pairs and not related.

B) The correction to be applied to the potential of the neuron j neighbouring i at date t is given by a term, which serves to inhibit the neuron j by a quantity equal to the excitation received by the neuron i at the same date. For example, the inhibition can be given by:

$e_{ij} \cdot \max(0, \Delta E(\{p_j(t-1)\}))$ if the excitation on i at t is $\max(0, \Delta E(\{p_j(t-1)\})) 0$ $(1-p_i(t)) \cdot e_{ij} \cdot \max(0, \Delta E(\{p_j(t-1)\}))$ if the excitation on i at t is $(1-p_i(t)) \cdot \max(0, \Delta E(\{p_j(t-1)\}))$.

Advantageously the potential of each neuron is limited between two values fixed by the user in order to accelerate convergence, e.g.:

the potential is limited between values of the order of magnitude of the corrections to be applied to the potential when the neuron is updated, the values of the potentials are limited between $-10^{-\infty}$ and $10^{-\infty}$, so that any strictly negative correction to be applied to the potential of an activated neuron deactivates it and any strictly positive correction to be applied to the potential of a deactivated neuron activates it.

FIG. 7 gives a device associated with the second neural network and which comprises:

- a first table memory 55 of the values of the outputs $p_i$ of the neurons,
- a second table memory 55 of the neighbours of each neuron,
- a third memory 57 of relations between the objects,
- a fourth memory 58 of the potentials of the neurons,
- a fifth memory 67,
- a first computing circuit 59 making it possible to compute the potential variation to be applied to the neuron i,
- a second computing circuit 60 making it possible to compute the potential variation to be applied to neighbouring neurons of the neuron i,
- a first adder 61 receiving the outputs of the first computing circuit and the fourth memory,
- at least one second adder 62 receiving the outputs of the second computing circuit and the fourth memory,
- at least two thresholding function circuits 64 and 65 of binary function F respectively connected to the outputs of said two adders.

In the case of a digital device, these different elements are connected either directly or indirectly to a clock.

The aforementioned algorithms have been applied to numerous fluid mechanics images. A trajectory in these images is constituted by three consecutive, aligned points. The ambiguity on the direction is removed by the use of a particular coding of the pulses, the duration between the first two pulses being equal to twice the duration between the two second pulses.

A study will now be made of an example of results of different processing operations performed in the process of the invention, successively considering the two aforementioned cases.

a) Case Where the Quality Factors ($F_2(i,j)$) Are Real

FIGS. 8, 9 and 10 show the results of the different processing operations performed. Thus, FIG. 8 shows the original image. The dimension of this image is 1500*1000 pixels. FIG. 9 shows the potential trajectories generated at the end of stage 12. On the basis of the original image 8, 6664 points were extracted and 1303 potential trajectories (triplets of points) were generated. The processing (stages 11 and 12) required 1030 ms on a standard working station of type Sun Sparc 10. The time required for performing the stages 13 and 14 (determination of the constraints and calculating the qualities between pairs of signals) required 2390 ms. The last stage of the processing required 2880 ms, i.e. in all for the complete processing of the image 6290 ms. FIG. 10 shows the final result supplied by the algorithm using real quality factors. 775 trajectories of particles were recognized on said image.

b) Case Where the Quality Factors ($F_2(i,j)$)) Are Binary

The initial image and the image of the generated potential triplets are the same as hereinbefore, namely FIGS. 8 and 9 respectively. The result of the processing by neuromimetic network supplies the image 11. 510 trajectories were extracted in 1 mn 4680 ms (time required for stages 13, 14 and 15).

Lexicon

Object

An object has a physical reality and it is e.g. a particle, an air bubble, a spangle, a star, etc. The object of the process is to automatically determine the trajectories of different objects in time.

Fragment

A fragment is a recording of the position in space of an object at a certain date. The procedure processes a set of fragments.

Class of Fragments

The process segments the set of fragments into classes, each being characteristic of a single object recorded at different times. A particular class corresponds to fragments not associated with objects by the process. All the fragments of this class are considered like noise in the sense of the processing of the signal. The classes must be pairwise non-contiguous. The number of fragments in a characteristic class of an object is an input of the process: i.e. the number of times at which recordings are made.

Trajectory

A trajectory is a class of fragments associated with an object.

Neuron

A neuron i is defined by a potential $u_i$ and by a binary output $p_i$. When, during the dynamic operation of the network, the neuron is considered at the date t, then:

a correction $\Delta u_i(t)$ is calculated which has to be applied to the potential $u_i(t+1)=u_i(t)+\Delta u_i(t)$, updating takes place of the output:
  if $u_i(t+1)>0$ then $p_i(t+1)=1$
  if $u_i(t+1)<0$ then $p_i(t+1)=0$
  activated neuron $p_i=1$
  deactivated neuron $p_i=0$ Relation Expression of the compatibility of two potential trajectories in a velocimetry application, two resource/demand pairs in a resource allocation application, and more generally an edge between the nodes of a graph.

There is a set of potential trajectories and the aim is to extract a subset proving a certain property based on relations between potential trajectories. When considered in pairs, there is or is not a relation (resulting from an application) between the potential trajectories. If a potential trajectory i is a relation with a potential trajectory j, then $e_{ij}=1$, if not $e_{ij}=0$ ($e_{ij}$) being the matrix of relations between the potential trajectories.

We claim:

1. Process for obtaining trajectories of moving objects, by optimizing at least one criterion of the physics of the observed phenomenon, characterized in that it comprises the following stages:

a stage of recording signals formed from characteristic fragments of positions of objects at different instants, parts of the same nature as the fragments, but which are noise, and parts attributable to noise without any possible confusion;

a stage of extracting parts of signals having the same nature as the fragments and determination of characteristics associated therewith, on the basis of a priori knowledge on their nature and on the sought trajectory;

a stage of subdividing all the parts of signals previously extracted into classes, each class representing a potential trajectory and having a predetermined number of fragments;

a stage of selecting a subset of classes satisfying constraints linked with the type of phenomenon observed and comprising:

the generation of a set of n-uplets constituted by a subset of n classes, the measurement of the compatibility of the classes assembled in n-uplets by a first analytical function determined on the basis of constraints linked with the type of phenomenon observed and the acquisition device, the measurement of the quality of the n-uplets by a second analytical function, determined on the basis of constraints linked with the phenomenon observed and the acquisition device;

a stage of selecting from among the classes representing the potential trajectories of those satisfying constraints, by a process of optimizing among the constraints of at least the preceding criterion or criteria using preceding compatibility and quality measurements, so as to obtain "real" trajectories of the objects.

2. Process according to claim 1, wherein in the first stage the position of the objects is recorded at several separate, consecutive times, separated by fixed time intervals.

3. Process according to claim 1, wherein during the recording stage, when it is impossible to work in real time, the processing of the conditioning of the signals obtained involves a signal storage substage.

4. Process according to claim 3, wherein the signals are preprocessed prior to their storage.

5. Process according to claim 1, wherein the n-uplets are pairs.

6. Process according to claim 1, wherein the final selection stage of subsets of mutually compatible shapes is performed using a neural network.

7. Process according to claim 1, which can be used for the extraction of given shapes in a noisy environment.

8. Process according to claim 1, wherein the objects are particles.

9. Device for performing the process according to claim 1 comprising a recording device, a characteristic extraction module, a potential trajectory generating module, a problem shaping module and an optimization problem solving module.

10. Device according to claim 9, wherein the recording device comprises a signal sampling stage, an acquisition stage and a recording stage.

11. Device according to claim 9, wherein the optimization problem solving module comprises a neural network.

12. Device according to claim 11, wherein said neural network comprises:

a first table memory for the outputs pi of neurons receiving the output of a circuit for drawing or choosing an integer from 1 to N, a second memory of the relations between the objects, a third table memory of potentials of neurons, a fourth table memory of the final variations of potentials of neurons, a first computing circuit making it possible to compute $A \cdot P_i \cdot T(\{p_j\})$, a second computing circuit making it possible to compute $B \cdot (1-p_i) \cdot S(\{p_j\})$, a third computing circuit making it possible to compute $C \cdot R(\{p_j\})$, these three computing circuits being connected to the outputs of the two first memories;

an interruption device connected to the output of the third computing circuit and the outputs of the fourth memory, a first adder receiving the outputs of the first two computing circuits and the interruption device, a second adder receiving the outputs of the third memory and the first adder, a thresholding function circuit having a binary output receiving the output of the second adder.

13. Device according to claim 11, wherein said neural network comprises:

a circuit of drawing or choosing an integer between 1 and N, a first table memory of the values of the outputs $p_i$ of the neurons, a second memory listing neighbours of each neuron, a third memory for relations between the objects, a fourth memory of the potentials of neurons, a fifth memory containing the current value of the quality function E, a first computing circuit making it possible to compute the potential variation to be applied to the neuron i, a second computing circuit making it possible to compute the potential variation to be applied to neighbouring neurons of the neuron i, a first adder receiving the outputs of the first computing circuit and the fourth memory, at least one second adder receiving the outputs of the second computing circuit and the fourth memory, at least two binary thresholding function circuits F respectively connected to the outputs of said two adders.

* * * * *